United States Patent [19]

Braud

[11] Patent Number: 4,582,483

[45] Date of Patent: Apr. 15, 1986

[54] MOBILE SIDE MEMBER FURNACE FOR HEATING IRON AND STEEL PRODUCTS

[75] Inventor: Yves Braud, Maurepas, France

[73] Assignee: Stein Heurtey Ste Anonyme, Ris Organis, France

[21] Appl. No.: 686,236

[22] Filed: Dec. 26, 1984

[30] Foreign Application Priority Data

Aug. 17, 1984 [FR] France .............................. 84 13105

[51] Int. Cl.[4] ......................... F27D 3/04; B65G 25/00

[52] U.S. Cl. ..................................... 432/127; 198/774

[58] Field of Search ....................... 432/122, 127, 128; 198/774, 776, 614

[56] References Cited

U.S. PATENT DOCUMENTS 1,000,828 8/1911 Lorillard ............................ 198/776

*Primary Examiner*—John J. Camby
*Attorney, Agent, or Firm*—Karl F. Ross; Herbert Dubno

[57] ABSTRACT

First and second arrays of alternately fixed and mobile, transversely spaced, elongated fire dogs are arranged in a furnace for heating iron and steel products, the fire dogs lying parallel to the longitudinal axis thereof, the second array being transversely offset from the first array, whereby the fixed fire dogs of the first array extend therebeyond substantially to a line common with the ends of the fixed fire dogs of the second array, the mobile fire dogs of the second array extending therebeyond and overlapping the extended portions of the fixed fire dogs of the first array, one of the mobile fire dogs of each array lying midway between the fixed fire dogs thereof, and one of the fixed fire dogs of each array lying midway between the mobile fire dogs thereof.

1 Claim, 1 Drawing Figure

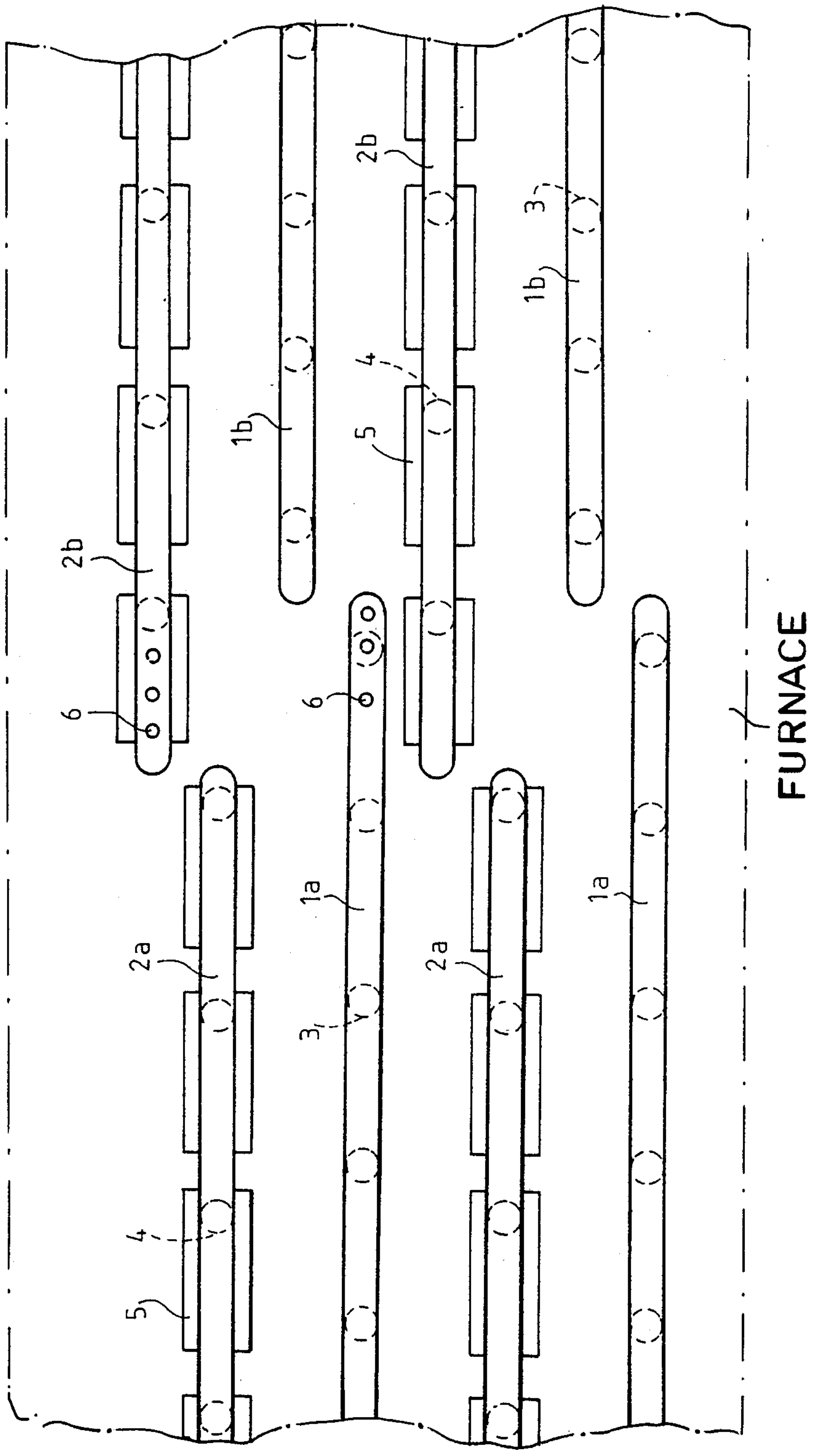
2b
1b
3
4
5
6
2a
1a
FURNACE

MOBILE SIDE MEMBER FURNACE FOR HEATING IRON AND STEEL PRODUCTS

FIELD OF THE INVENTION

The present invention relates to walking beam furnaces and improved fire dogs for same.

BACKGROUND OF THE INVENTION

Iron and steel parts such as blooms or billets, before rolling, are heated in generally continuous furnaces. In these furnaces, the iron and steel products are very often supported by cooled tubes surrounded by a lagging called "fire dogs", via cylindrical supports fixed to the fire dogs with even spacing and called studs or buttons.

These fire dogs are fixed in blast furnaces. In so called "walking beam" furnaces, half of the fire dogs may be moved in a vertical plane, with a circular or rectangular movement; this movement causes the products to advance in the furnace, by successive steps. In this type of furnace, these fire dogs up to present have always had their axis parallel to the longitudinal axis of the furnace.

The fire dogs are the cause of heating defects due to the shadow effect of the blocked radiation of the furnace on the supported face of the products. To this shadow effect is added the pin point cooling due to the contact of these products with the studs which support them directly.

Such shadow effect and pin point cooling generate lower temperature zones called "blank traces" on the products which then cause disturbances during rolling.

It is known to reduce these blank traces by slanting or offsetting the fire dogs with respect to the axis of the furnace so as to expose all the parts of the supported face of the products to the radiation for a length of time substantially equal in the same intervals.

When it is a question of a walking beam furnace, this condition is more difficult to achieve because of the successive passages of the product over the fixed fire dogs and the mobile fire dogs which means that the different parts of the supported surface are not exposed in the same way and do not receive the same amounts of radiation during the passage through the furnace.

OBJECT OF THE INVENTION

The object of the present invention is to provide a walking beam furnace for heating steel products, in which the temperature difference causing blank traces is very much reduced.

SUMMARY OF THE INVENTION

The furnace of the invention is characterized in that fixed and mobile fire dogs are equidistant from each other and in that the fixed fire dogs as well as the mobile fire dogs have the same transverse offset substantially in the middle of the furnace, this offset being equal to a quarter of the gap between two fixed fire dogs or between two mobile fire dogs.

With such an arrangement, all the lower surface of the products is exposed to the radiation of the lower part of the furnace and is thus heated substantially uniformly, which practically avoids the formation of black traces.

BRIEF DESCRIPTION OF THE DRAWING

An embodiment of the furnace of the invention will be described hereafter, by way of non limitative example, with reference to the sole FIGURE of the accompanying drawing which shows schematically in a top view the arrangement of the fire dogs in the furnace.

SPECIFIC DESCRIPTION

In the drawing, the fixed fire dogs are shown at 1a and 1b and the mobile fire dogs at 2a and 2b, in a first array of alternately fixed and mobile fire dogs 1a and 2a respectively and a second array of alternately fixed and mobile fire dogs 1b and 2b respectively, the first and second array being transversely offset from one another, these fire dogs being parallel to the longitudinal axis of the furnace. These fire dogs are fixed to respective supports or "skittles" 3 and 4, the skittles 4 of the mobile fire dogs passing through elongate openings 5 in the hearth of the furnace, adapted for longitudinal movement. On the different fire dogs are mounted studs some of which have been shown at 6.

The fixed fire dogs 1a or 1b and the mobile fire dogs 2a and 2b are equidistant from each other, that is to say that the gaps separating two adjacent fixed fire dogs 1a or 1b is equal to that separating two adjacent mobile fire dogs 2a or 2b, the mobile fire dogs being placed in the middle of the gap between the fixed fire dogs.

The fixed and mobile fire dogs are disposed transversely substantially in the middle of the furnace, i.e. at a distance equal to charging and discharging.

The offset of the fixed fire dogs 1a of the first array with respect to the fixed fire dogs 1b of the second array is the same as the offset of the mobile fire dogs 2a of the first array with respect to the mobile fire dogs 2b of the second array and equal to a quarter of the gap between two fixed fire dogs 1a or 1b and two mobile fire dogs 2a or 2b. After offsetting, a fixed or mobile fire dog of one array is thus in the middle of the gap separating a fixed fire dog from a mobile fire dog of the other array.

It goes without saying that the present invention should not be considered as limited to the embodiment described and shown but covers on the contrary all variants thereof.

I claim:

1. A walking beam furnace for heating iron and steel products, said furnace having a longitudinal axis and comprising:

- a first array of alternately fixed and mobile transversely spaced first elongated fire dogs lying parallel to the longitudinal axis of said furnace over one portion of the length thereof, said mobile fire dogs being spaced apart by a distance equal to the spacing between said fixed fire dogs, said fixed fire dogs extending equally longitudinally beyond said mobile fire dogs; and
- a second array of alternately fixed and mobile transversely spaced second elongated fire dogs lying parallel to the longitudinal axis of said furnace over another portion of the length thereof, said second mobile fire dogs being spaced apart by a distance equal to the spacing between said first mobile fire dogs and said second fixed fire dogs, said second array being transversely offset from said first array whereby said first fixed fire dogs extend substantially to a line common with the ends of said second fixed fire dogs, said second mobile fire dogs extending longitudinally beyond said second array and overlapping the extended portions of said first fixed fire dogs, one of said mobile fire dogs of each array lying midway between the fixed fire dogs thereof and one of the fixed fire dogs of each array lying midway between the mobile fire dogs thereof.

* * * * *